(12) United States Patent
Cartwright et al.

(10) Patent No.: US 12,426,711 B2
(45) Date of Patent: Sep. 30, 2025

(54) FAN BASE

(71) Applicant: Vornado Air, LLC, Andover, KS (US)

(72) Inventors: Brian Cartwright, Wichita, KS (US); Byron Loibl, Wichita, KS (US); Anthony Fischer, Wichita, KS (US); Glen Ediger, North Newton, KS (US)

(73) Assignee: Vornado Air, LLC, Andover, KS (US)

( * ) Notice: Subject to any disclaimer, the term of this patent is extended or adjusted under 35 U.S.C. 154(b) by 47 days.

(21) Appl. No.: 18/241,777

(22) Filed: Sep. 1, 2023

(65) Prior Publication Data

US 2024/0049880 A1 Feb. 15, 2024

Related U.S. Application Data

(63) Continuation-in-part of application No. PCT/US2022/018895, filed on Mar. 4, 2022, which is a continuation of application No. 17/192,823, filed on Mar. 4, 2021, now Pat. No. 11,350,748, which is a continuation-in-part of application No. 29/748,708, filed on Aug. 31, 2020, now Pat. No. Des. 990,655.

(60) Provisional application No. 63/453,053, filed on Mar. 17, 2023.

(51) Int. Cl.
 A47B 97/00 (2006.01)
 F04D 29/64 (2006.01)
 F16B 2/12 (2006.01)
 F16M 13/02 (2006.01)

(52) U.S. Cl.
 CPC ............ *A47B 97/00* (2013.01); *F04D 29/646* (2013.01); *F16B 2/12* (2013.01); *F16M 13/022* (2013.01); *A47B 2200/0085* (2013.01); *A47B 2200/06* (2013.01)

(58) Field of Classification Search
 CPC ......... A47B 97/00; F04D 29/646; F16B 2/12; F16M 13/022
 USPC ..................................... 248/231.41
 See application file for complete search history.

(56) References Cited

U.S. PATENT DOCUMENTS

| | | |
|---|---|---|
| D181,416 S | 11/1957 | Hewitt |
| D282,491 S | 2/1986 | Doyel |
| 4,799,858 A | 1/1989 | Shin-Chin |
| 4,850,804 A | 7/1989 | Huang |
| 4,927,120 A * | 5/1990 | Wang ............. F16M 11/10 248/676 |
| 5,435,696 A * | 7/1995 | Cunning ............ F04D 29/601 416/246 |
| 5,547,343 A * | 8/1996 | Jane .................. F04D 29/601 416/246 |
| 5,842,671 A | 12/1998 | Gibbs |

(Continued)

*Primary Examiner* — Todd M Epps
(74) *Attorney, Agent, or Firm* — Avyno Law P.C.

(57) ABSTRACT

A removable support base is provided that includes interchangeable decorative disks. In one example, a desk fan is provided that includes a fan supported by a support post that is positioned on the top of the removable support base. The removable support base has an upper plate and lower support member that are removably attached to the support post. The upper plate member is separable from the lower support member when detached from the support post. The desk fan further includes a first interchangeable substrate or decorative disk positioned between the upper plate and lower support member. The desk fan further including additional interchangeable decorative disks for interchanging with the first interchangeable decorative disk.

20 Claims, 18 Drawing Sheets

(56) References Cited

U.S. PATENT DOCUMENTS

| | | | |
|---|---|---|---|
| 6,886,270 B2 * | 5/2005 | Gilmer | F04D 29/601 34/239 |
| 6,957,795 B1 | 10/2005 | Hsieh | |
| D638,696 S | 5/2011 | Kubota | |
| D669,164 S | 10/2012 | Hsu | |
| D675,312 S | 1/2013 | Zhu et al. | |
| D723,021 S | 2/2015 | Guyot | |
| D727,488 S | 4/2015 | Hsu | |
| D771,614 S | 11/2016 | Chang | |
| 9,677,703 B2 * | 6/2017 | He | F04D 29/646 |
| D829,880 S | 10/2018 | Ediger et al. | |
| D881,371 S | 4/2020 | Hollinger | |
| D902,374 S | 11/2020 | Li | |
| 11,350,748 B2 * | 6/2022 | Ediger | F04D 29/646 |
| 11,378,100 B2 * | 7/2022 | Hu | F04D 25/084 |
| 11,536,294 B1 * | 12/2022 | Zhu | F04D 29/046 |
| 11,629,732 B1 * | 4/2023 | Zhu | F04D 25/08 248/689 |
| 2014/0300164 A1 | 10/2014 | Oda | |
| 2019/0295446 A1 | 9/2019 | Hung | |
| 2020/0240578 A1 | 7/2020 | Chen et al. | |
| 2022/0061532 A1 | 3/2022 | Ediger | |

\* cited by examiner

FAN BASE

RELATED APPLICATIONS

This application is a continuation-in-part of Patent Cooperation Treaty Application No. PCT/US22/18895 filed Mar. 4, 2022, titled Desktop Fan Clamp, which application claims priority to U.S. patent application Ser. No. 17/192,823, titled Desktop Fan Clamp, having a filing date of Mar. 4, 2021 (now U.S. Pat. No. 11,350,748), which US application claims priority to U.S. Design patent application Ser. No. 29/748,708, filed on Aug. 31, 2020, titled Fan Clamp (now U.S. D990,655); and also claims priority to U.S. Provisional Patent Application Ser. No. 63/453,053 filed Mar. 17, 2023, titled Fan Base, all of the above applications incorporated into this application in their entirety.

FIELD OF INVENTION

The invention relates to a support base for supporting articles, such as a fan, where the support base includes interchangeable decorative disks for displaying on the support base.

BACKGROUND

Often, it is desirable to attach a fan to the edge of a desk, counter, table, shelf, or other flat surface. This requires a clamping device to secure the fan to the edge of the support surface of the object. Typically, clamping a fan or other device to the edge of a support surface involves the uses of a clamp designed to resemble, or be based upon the principle of, a clip or more commonly a C-clamp mechanism. These types of clamps may be referred to as a table clamp. These clamps are often unattractive and utilitarian looking, having exposed parts, such as bolts and screws.

While it remains desirable to clamp a fan to the edge of a tabletop or desk to minimize clutter and free the space consumed by the fan, current solutions remain unattractive, clunky and do not allow for the easy adjustment of the direction of air flow from the fan. A need therefore exists for a fan clamp that is functional, yet aesthetically pleasing, while allowing for the fan head to pivot and/or swivel about the fan clamp.

SUMMARY

The present invention relates to a fan clamp design such that all mechanical elements are contained within the clamp and not visible in any application. The fan clamp of the present invention is provided for supporting a fan on a support surface by clamping to the support surface. The fan clamp includes a clamp assembly having an upper clamp member for engaging a top side of the support surface, a lower clamp member for engaging a bottom side of the support surface and a screw adjustment assembly extending through the lower and upper clamp assembly for clamping the upper clamp assembly and lower clamp assembly to the support surface. The clamp assembly further includes a shield extending from the lower clamp assembly through the upper clamp assembly that partially surrounds the screw adjustment assembly to block the screw adjustment assembly from being visible when the lower and upper clamp assemblies move away from each other to engage a support surface. The fan clamp may further include an arm extending from the clamp assembly for supporting a fan. The arm may be a swing arm that is rotatably connected to the fan clamp. Further, the upper and lower clamp assembly may each include a non-slip pad surface.

The shield of the fan clamp may be, for example, a C-shaped tubular member or a shield shaped tube. The upper clamp assembly may further include a cylindrical member for enclosing the shield and screw as they extend through the upper clamp assembly. The arm may include a sleeve rotatably coupled to the outer circumference of the cylindrical member so that the arm may swivel about the cylindrical member.

In accordance with another example of an implementation of the invention, the fan clamp includes a screw adjustment assembly where the screw adjustment assembly has a screw attached at one end to an adjustment knob. The fan clamp further includes a lower clamp member having a lower plate with a lower pad affixed to the upper surface of the lower plate and a C-shaped tubular member positioned behind the lower pad on the upper surface of the lower plate. The C-shaped tubular member is positioned to surround an opening in the lower plate for receiving the screw of the screw adjustment assembly from the underside of the lower plate of the lower clamp member. An upper clamp member positioned opposite the lower clamp member is also provided that includes an upper plate having an upper pad affixed to the lower surface of the upper plate, the upper clamp member further including a cylindrical member positioned on top side of the upper plate, the cylindrical member includes a C-shaped channel for receiving the C-shaped tubular member and a shaft for engaging the screw of the screw adjustment assembly. The rotation of the adjustment knob moves the screw through the shaft of the cylindrical member which, when turned in one direction, moves the lower clamp member toward the upper clamp member and, which when turned in the opposing direction, moves the lower clamp member away from the upper clamp member.

In this example, the cylindrical member may include a threaded insert surrounding a portion of the shaft for engaging the screw of the screw adjustment assembly. The fan clamp may further include a swing arm having a sleeve rotatably coupled to the outer circumference of the cylindrical member of the upper clamp. A fan attachment may also be provided for pivotally attaching a fan to the end of the swing arm positioned away from the upper clamp member. The adjustment knob and cylindrical member of the upper clamp may further be axially aligned longitudinally, and the lower pad and upper pad may be comprised of, or include, a non-slip surface. For cord management, the fan clamp may also include a cord cleat on the upper clamp member, for example, positioned on the cylindrical member or on the upper plate of the upper clamp member.

In yet another example of an implementation of the invention, a fan clamp is provided that includes (i) a screw attached at one end to an adjustment knob; (ii) a lower plate having a lower non-slip pad attached on the top surface of the lower plate, where the lower plate includes an opening for receiving the screw; and (iii) an upper plate member having an upper non-slip pad attached on the bottom surface of the upper plate, where the upper plate further includes a threaded shaft for receiving the screw. The fan clamp further includes a shield positioned on the lower plate surrounding the opening for receiving the screw where the shield is taller than the thickness of the lower plate with lower non-slip pad and upper plate with upper non-slip pad, where the upper plate further includes a channel opening for receiving the shield such that the shield remains extended between the upper and lower plate as the plates move toward and away from one another to engage a support surface.

The fan clamp may further include a cylindrical member positioned on the top of the upper plate for receiving the shield as it extends through the channel opening on the upper plate and the screw as it extends through the threaded shaft. A swing arm may further be coupled to the outer circumference of the cylindrical member with a sleeve so that the swing arm may swivel about the fan clamp. A fan attachment may further be attached to the end of the swing arm positioned away from the cylindrical member for attaching a fan to the end of the swing arm. The upper plate may further include an opening for receiving the screw where the threaded shaft is positioned above the opening. The thread shaft may further be a threaded insert. The upper plate member may also include a cord cleat for cord management.

In yet another example of an implement, the clamp is replaced with a removable support base that includes interchangeable decorative disks. Here, a desk fan is provided that includes a fan supported by a support post that is positioned on the top of the removable support base. The removable support base has an upper plate and lower support member that are removably attached to the support post. The upper plate member is separable from the lower support member when detached from the support post. The desk fan further includes a first interchangeable substrate positioned between the upper plate and lower support member. The first interchangeable substrate may be a decorative substrate, such as a decorative disk.

In operation, the first interchangeable substrate or decorative substrate is interchanged with a second decorative substrate by disconnecting the removable support base from the support post, separating the upper plate member and lower support member, removing the first decorative substrate from between the upper plate and lower support member and replacing it with the second decorative substrate. The upper plate member may be transparent or translucent to allow the decorative substrate positioned under the upper plate member to be seen through the upper plate member. The support base may come with a plurality of additional interchangeable or decorative substrates for replacing the first decorative substrate.

In this example, the removable support base may be fastened to the support post with a screw. The removable support base may have a central opening for receiving the screw and the support post may have a threaded insert located at the bottom of the support post for receiving the screw. In one example, the removable support base and interchangeable substrate may be circular and having substantially the same, or the same diameter.

In still another example, a support base for supporting an article may be provided. The support base has an upper plate and lower support member, where the upper plate is removably secured to the lower plate and where the upper plate member is transparent. The support base further includes a first interchangeable substrate positioned between the upper plate and lower support member, where first interchangeable substrate is a first decorative substrate that is interchangeable with a second decorative substrate. The first and second decorative substrates may be interchanged by separating the upper plate member from the lower support member, removing the first decorative substrate from between the upper plate and lower support member and replacing it with the second decorative substrate. A plurality of additional interchangeable substrates for replacing the first interchangeable substrate may be provided.

The support base is affixed to a support post extending from the top of the support base to support an article, such as a fan. The support base is removably affixed to the post by a fastener. In one example, the fastener may be is a screw that extends upward through a central opening in the support base. The support post includes a threaded insert located at the bottom of the support post for receiving the screw. The support base and interchangeable substrates may be circular and have a substantially similar or same diameter.

In another example, the desk fan of the present invention may include a cylindrical support post having an outer circumference and a removable support base. The removable support base is positioned at one end of cylindrical support post and has an upper plate and lower support member. The upper plate and the lower support member are removably attached to the support post. The upper plate member is translucent and separable from the lower support member when the removable support base is detached from the support post. The desk fan further includes a first interchangeable decorative substrate positioned between the upper plate and lower support member. A swing arm is rotatably coupled to the outer circumference of the cylindrical support post using a circular sleeve so that the swing arm may swivel about the cylindrical support post. A fan is attached to the swing arm at its end opposing the circular sleeve.

The removable support base has a central opening for receiving a screw and the cylindrical support post includes a threaded insert located at its bottom for receiving the screw. The removable support base and interchangeable decorative substrate is circular and have the same or substantially the same diameter. The desk fan may include a plurality of additional interchangeable decorative substrates for replacing the first interchangeable decorate substrates.

Other devices, apparatus, systems, methods, features and advantages of the invention are or will become apparent to one with skill in the art upon examination of the following figures and detailed description. It is intended that all such additional systems, methods, features and advantages be included within this description, be within the scope of the invention, and be protected by the accompanying claims.

DESCRIPTION OF FIGURES

The invention may be better understood by referring to the following figures. The components in the figures are not necessarily to scale, emphasis instead being placed upon illustrating the principles of the invention.

DETAILED DESCRIPTION OF THE INVENTION

Figure 1:
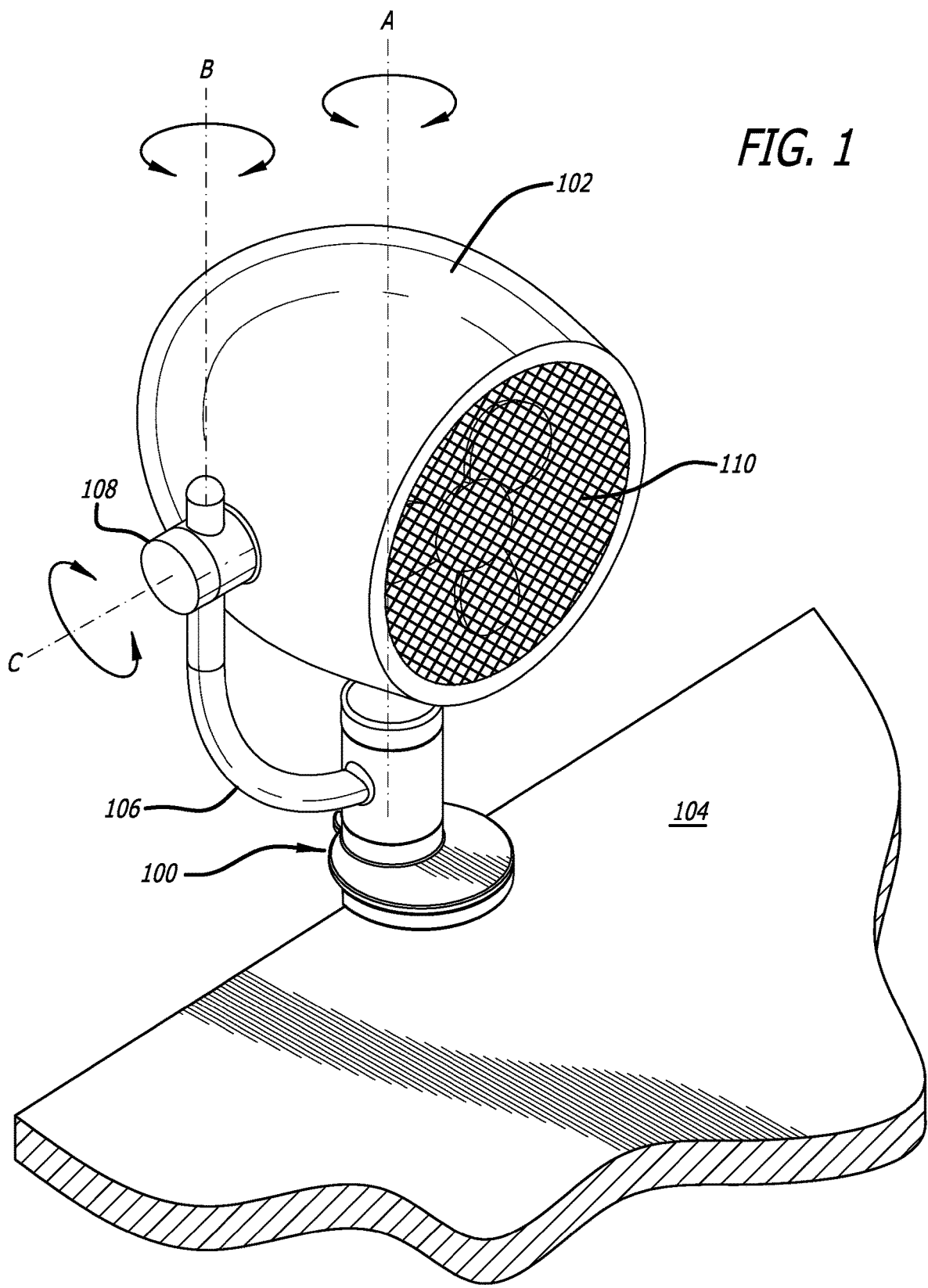
FIG. 1 illustrates a front view of one example of a fan clamp of the present invention supporting a fan and attached to the edge of a support surface.

As illustrated in the attached FIGS. 1-6, a fan clamp 100 is provided for supporting a fan 102 on the edge of support surface 104, such as a desk, counter, table, shelf or other surface, to minimize the amount of space taken up by the fan 102 on the surface 104. The fan clamp 100 is constructed to allow the fan 102 to be adjustable about the fan clamp 100, to move and angle the face 110 of the fan 102 up, down and side-to-side, and to also allow for the horizontal adjustment of the fan 102 over and away from the support surface 104. The fan clamp 100 design of the present invention allows for the screw adjustment mechanism 204 (FIG. 2) of the fan clamp 100 to be contained with the body of the fan clamp 100.

In particular, FIG. 1 illustrates a front view of one example of an implementation of a fan clamp 100 supporting a fan 102 and on the edge of a support surface 104. As seen in FIG. 1, the fan clamp 100 further includes a swing arm 106. Swing arm 106 extends between the fan clamp 100 and the fan 102, with the swing arm 106 attached at one end to the fan clamp 100 at its other end to the fan 102. In this example, the fan 102 is pivotally attached to the swing arm 106 using a fan attachment 108. The design of the fan attachment 108 and swing arm 106 may vary for different products and/or product configurations.

In this example, the fan 102 may be rotated horizontally about axis A, which allows the fan 102 to rotate about the fan clamp 100. In certain applications, the fan 102 may also be rotated horizontally about axis B, which rotates the fan 102 about the swing arm 106. With the example fan attachment 108 used in this implementation, the fan 102 may also be rotated about the axis C, which rotates the face 110 of the fan 102 vertically up and down.

Figure 2:
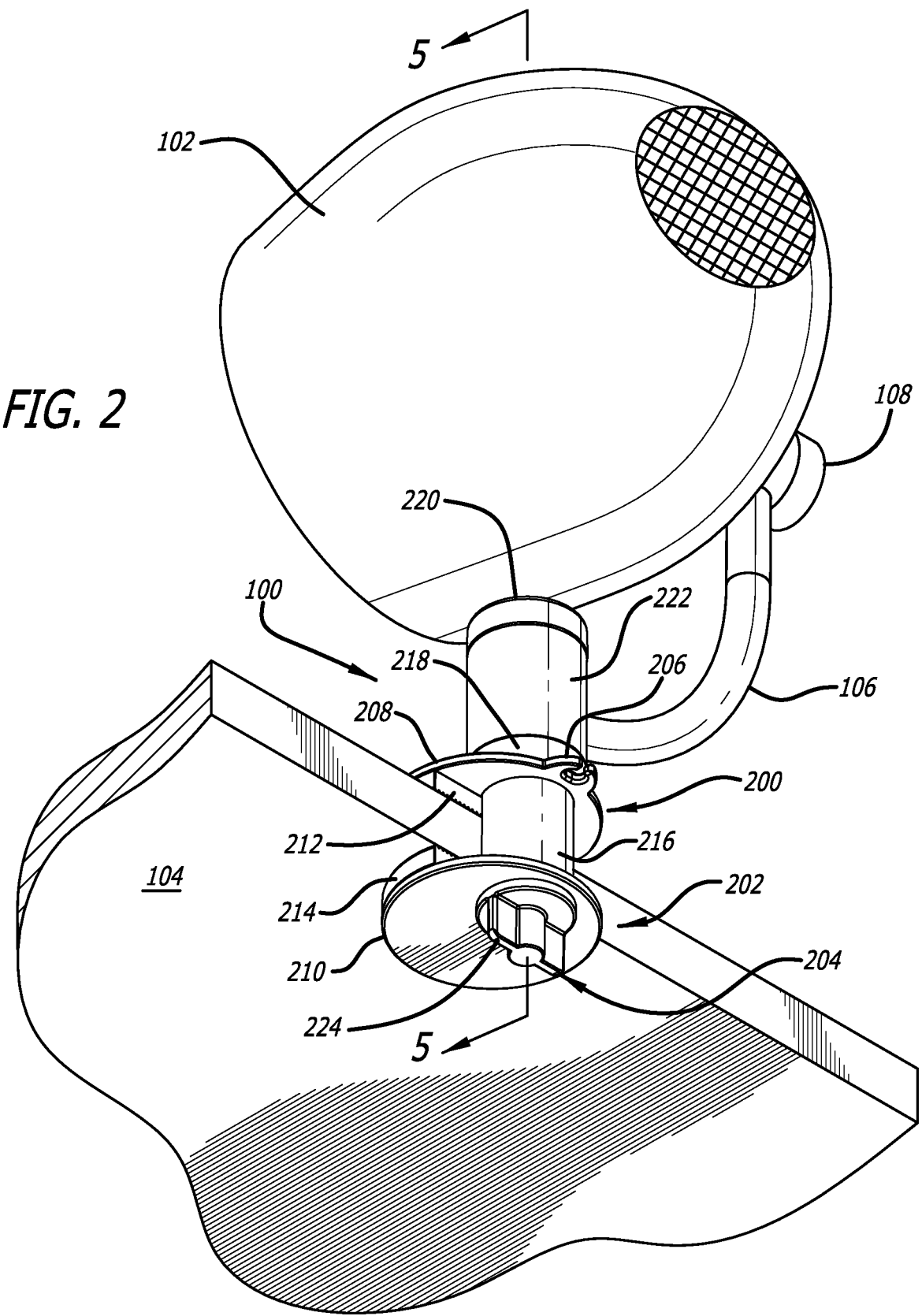
FIG. 2 illustrates a rear view of the fan clamp of FIG. 1 being attached to a support surface.

FIG. 2 illustrates a rear view of the fan clamp 100 of FIG. 1 being attached to a support surface 104. As illustrated in FIG. 2, the fan clamp 100 has an upper clamp member or upper clamp assembly 200, a lower clamp member or lower clamp assembly 202 and screw adjustment mechanism or screw adjustment assembly 204. The upper clamp member or assembly 200, lower clamp member or assembly 202 and the screw adjustment mechanism or assembly 204 may be referred to as the clamp member or clamp assembly.

The upper clamp member 200 includes a upper plate 208 having an upper pad area with an upper pad 212 attached to the underside of the upper plate 208 on the upper pad area. The upper pad 212 is designed to rest against the top of the support surface 104 to which the fan clamp 100 attaches. This upper pad 212 may be made of, or covered with, a soft non-slip material.

The lower clamp member 202 includes a lower plate 210 having a lower pad area with a lower pad 214 attached to the top side of the lower plate 210 on the lower pad area. The lower pad 214 is designed to rest against the bottom of the support surface 104 to which the fan clamp 100 attaches. This lower pad 214 may be made of, or covered with, a soft non-slip material.

The upper clamp member 200 further includes a cylindrical member 218 attached to, or integrated with, the upper surface of the upper plate 208. As demonstrated further in connections with FIGS. 4-6, the upper plate 208 and cylindrical member 218 are designed to receive the screw 402 (FIG. 4) of the screw adjustment mechanism 204. Similarly, the lower clamp member 202 includes a shield or shield member 216, which may be, for example, a C-shaped tube member or half pipe shaped tube, attached to top of the lower plate 210 behind the lower pad 214. The shield 216 is of a smaller circumference then cylindrical member 218 such that the shield 216 may be received within the walls of the cylindrical member 218. The shield 216 is designed to conceal the screw 402 of the screw adjustment mechanism 204 during use of the fan clamp 100.

The cylindrical member 218 on the upper clamp member 200 further includes an outer recessed portion of uniform height about its circumference. In this example, the swing arm 106 includes a sleeve 222 which is rotatably mounted within the recessed portion of the cylindrical member 218 to permit the swing arm 106 to rotate about the axis A (FIG. 1). The upper clamp member 200 further includes a cap 220 position on top of the cylindrical member 218 above the sleeve 222 to maintain the sleeve 222 on the cylindrical member 218.

Positioned below the lower plate 210 is an adjustment knob 224. As explained further below, the turning or rotation of the adjustment knob 224 by a user causes the fan clamp 100 to move from a closed to open position, and from an open to clamping position. Also as illustrated on FIG. 2, the upper clamp member 200 may include a cord cleat 206 for cord management.

Figure 3:
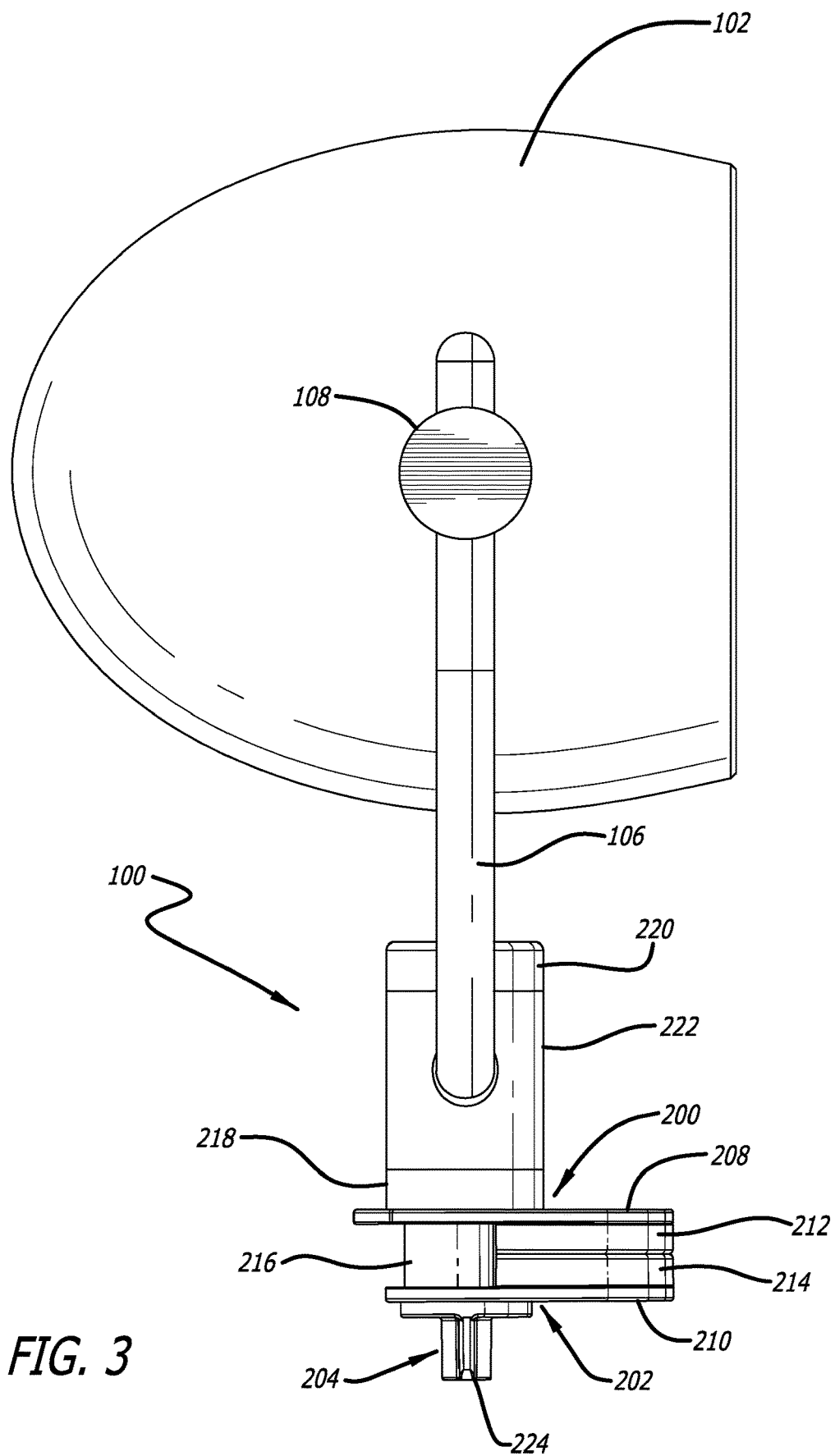
FIG. 3 illustrates a side view of the fan supported by the fan clamp of FIG. 1, with the fan clamp in the closed position.

FIG. 3 illustrates a side view of the fan 102 supported by the fan clamp 100 of FIG. 1, with the fan clamp 100 in a closed position. As discussed in connection with FIG. 2, the fan clamp 100 has a clamp assembly having three basic parts: the upper clamp member 200, lower clamp member 202 and screw adjustment mechanism 204. In all examples, the various parts that comprise the fan clamp 100 can be made of cast metals, plastic or other material suitable for the application.

As seen in FIG. 3, when the fan clamp 100 is in a closed position, the upper pad 212 attached to the underside of the upper plate 208 and the lower pad 214 attached to the upper side of the lower plate 210 meet. The shield 216 is affixed to the top side of the lower plate 214 positioned behind the upper pad 212 and lower pad 214 above the adjustment knob 224, and extends between the upper plate 208 and lower plate 210. The cylindrical member 218 of the upper clamp member 200 is positioned above the shield member 216 on top of the upper plate 208 in axial alignment with the adjustment knob 224. The alignment of the shield member 216 above the adjustment knob 224 and below the cylindrical member 218 allows for the concealment of the screw 402 (FIG. 4) that forms part of the adjustment mechanism 204 which allows the clamp to move from an open position, as seen in FIGS. 1 and 2, to a closed position, as seen in FIG. 3. FIG. 3 also illustrates swing arm 106 rotatably attached to the cylindrical member 218 via sleeve 222. The fan 102 is then pivotally attached to the upper portion of the swing arm 106 by fan attachment 108.

Figure 4:
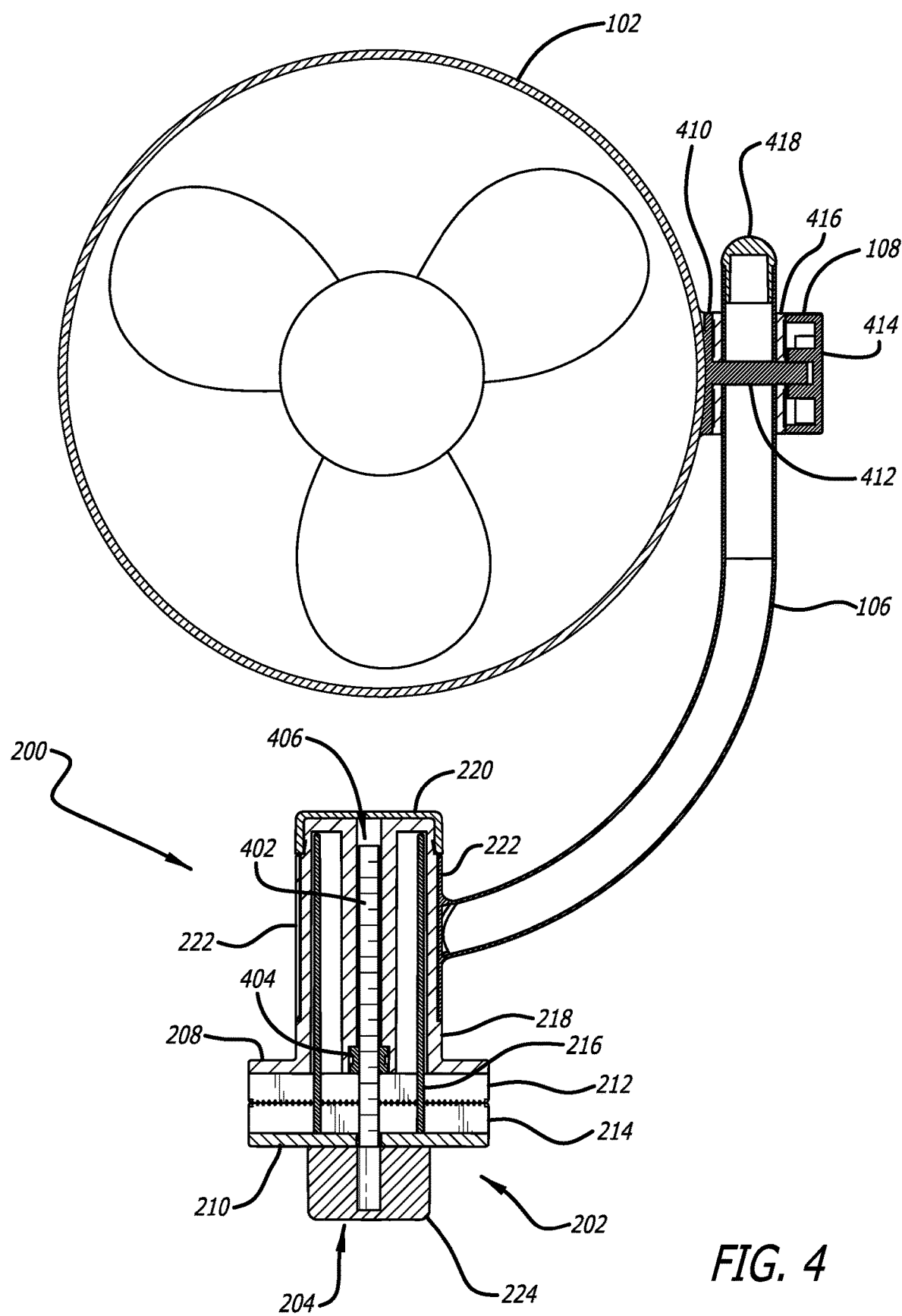
FIG. 4 illustrates a cross-section of the fan clamp of FIG. 3, taken along line 4-4 of FIG. 3, with the clamp in the closed position.

FIG. 4 illustrates a cross-section of the fan clamp 100 of FIG. 3, taken along line 4-4 of FIG. 3, showing the internal components of the fan clamp 100 when the fan clamp 100 in the closed position. As illustrated in FIG. 4, the screw adjustment mechanism 204 is attached to a screw 402 that extends substantially the length of the fan clamp 100. The upper clamp member 200 includes a circular cavity for receiving the shield member 216 as well as a cylindrical center cavity 406 for receiving the screw 402. A recess in the cylindrical member 218 also houses the threaded insert 404 that is positioned between the upper pad and the cylindrical member surrounding the opening of the cylindrical cavity 406. The screw 402 is then engaged by both the screw adjustment mechanism 204 and threaded insert 404. The threaded insert 406 is designed to accept the screw 402 within the cylindrical cavity 406 and move the screw from an extended to retracted position as the adjustment knob 224 is turned.

As the screw 402 extends from a retracted to extended position by turning the adjustment knob 224 of the screw adjustment mechanism 204 in a counterclockwise position, the lower clamp member 202 separates from the upper clamp member 200 to engage a support surface 104. Once the support surface is positioned between the upper pad 212 and lower pad 214, the adjustment knob 224 of the screw adjustment mechanism 204 is then turned in the clockwise direction to secure the fan clamp 100 against the support surface 104 between the upper pad 212 and lower pad 214 (as illustrated in FIGS. 1 and 2). As the screw 406 moves from a retracted to extended position, the shield member 216 also moves with the lower pad 214 and screw to conceal the screw 402 as it moves. The screw 402, shield member 216 and lower clamp member 202 moves together with the adjustment knob 224, is the adjustment knob 224 is turned in either the clockwise or counterclockwise direction. In this example, the adjustment knob 224 may be a wing-nut type handle to allow for the tightening of the screw when clamping.

FIG. 4 also illustrates a cross-section of the fan attachment 108 of the swing arm 106. Fan attachment 108 includes a mounting plate 410 having a pivot pin 412 extending therefrom. The pivot 412 extends through the swing arm 106 and is engaged with an attachment cap 414. A sleeve 426 is also positioned between the attachment cap 414 and mounting plate 410 to hide the pivot pin 412 attachment to the swing arm 106. Swing arm 106 further includes an arm cap 418 that may be snapped onto the top of the swing arm 106 using, for example, a friction fit. The mounting plate 410 then attaches to the fan 102 to support the fan 100 on the swing arm 106.

Figure 5:
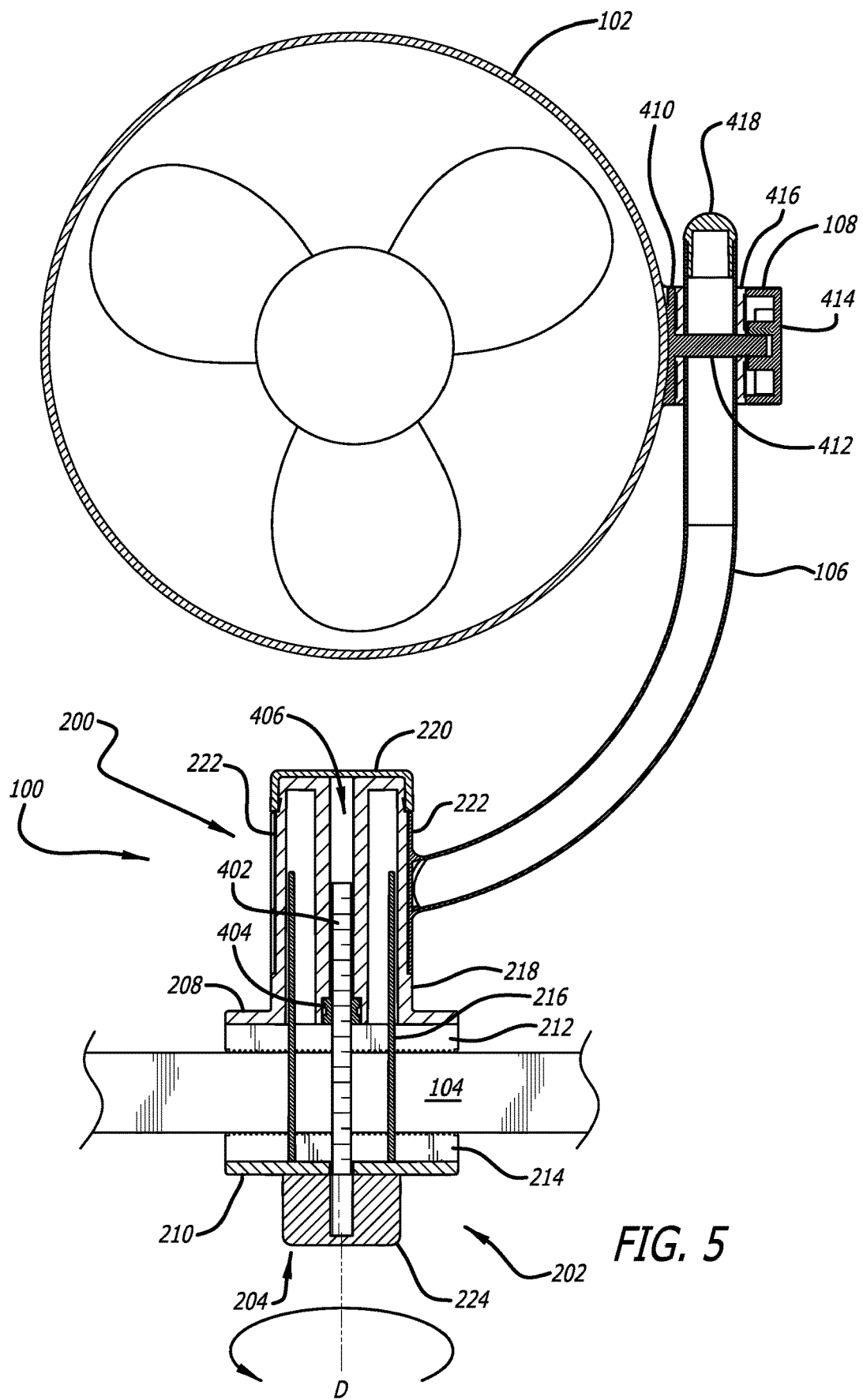
FIG. 5 illustrates a cross-section of the fan clamp of FIG. 2, taken along line 5-5 of FIG. 2, with the clamp in the open position and engaged with a support surface.

FIG. 5 illustrates a cross-section of the fan clamp 100 of FIG. 2, taken along line 5-5 of FIG. 2, with the clamp in the open position and engaging a support surface. In FIG. 5, the lower clamp member 214 has been moved to an extended position by turning the adjustment knob 224 of the screw adjustment mechanism 204 in a counterclockwise position. FIG. 5 best illustrates the movement of the screw 406 and lower clamp member 202, including the shield member 216 and lower pad 214 downward, to an extended position with the turning of the adjustment knob 224 in a counterclockwise position. The screw 402, shield member 216 and lower clamp member 202 moves together with the adjustment knob 224. In the extended position, the lower clamp member 202 separates from the upper clamp member 200 to engage a support surface 104. The movement of the shield member 216 with the lower clamp member 202 downward, extending from the cylindrical member, conceals the screw 402 as it moves.

Figure 6:
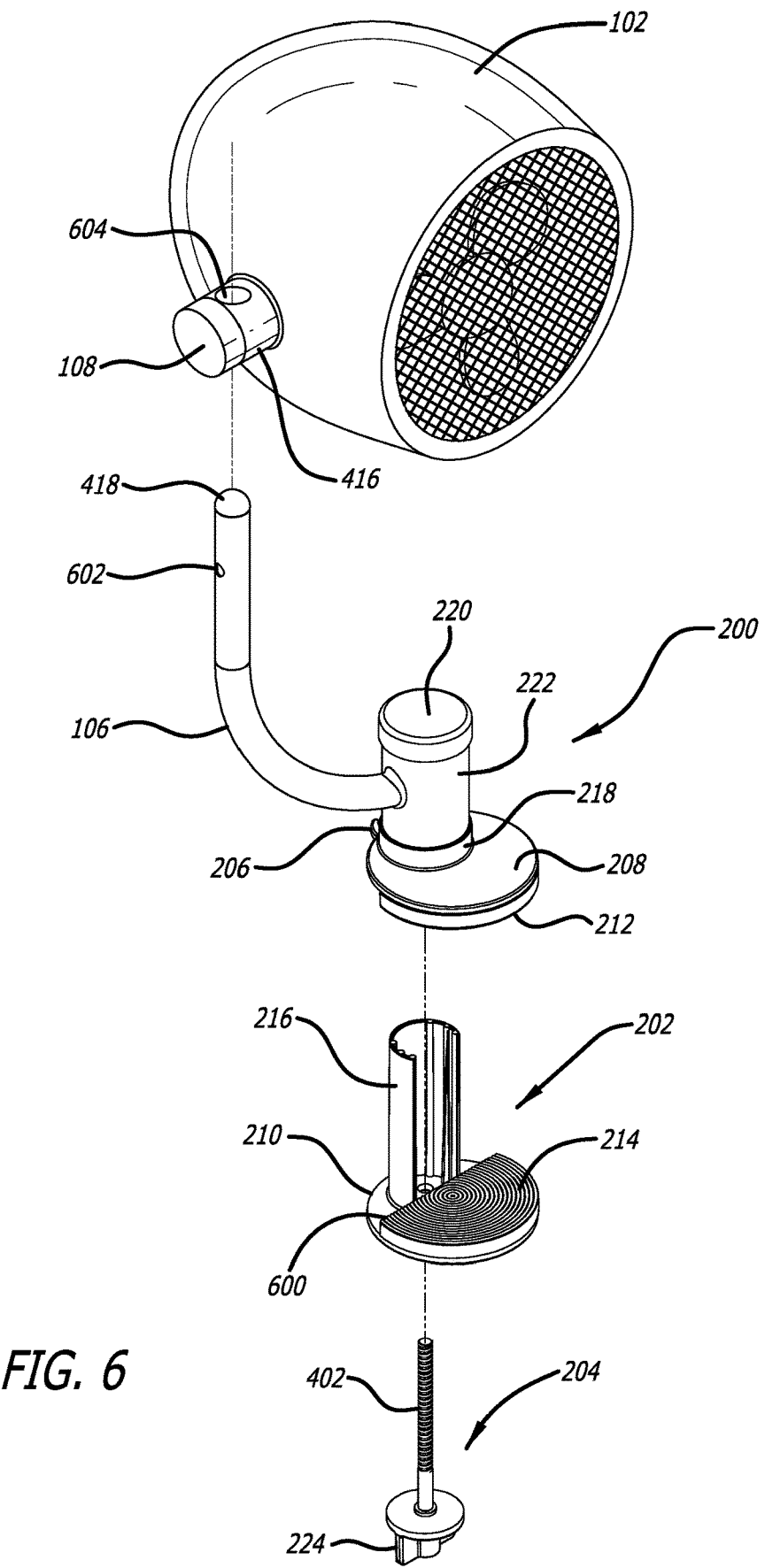
FIG. 6 is an exploded view of the fan clamp of the present invention.

FIG. 6 is an exploded view of the fan clamp 100 of the present invention. This figure best illustrates the shield member 216 positioned on top of the lower plate 210 behind the lower pad 214. The shield member 216 surrounds an opening in the lower plate 210 for receiving the screw 402. The screw 402 is affixed to the top of adjustment knob 214, which causes and screw to turn with the turning of the adjustment knob 214.

FIG. 6 also illustrates a hole 602 in the swing arm 106, including includes an opposing hole (not shown) on the opposite side of the swing arm 106 for receiving the pivot pen 412 of the fan attachment 108. A passage 604 and the sleeve 416 of the fan attachment 108 is also illustrated in FIG. 6, for receiving the swing arm 106.

FIG. 7-19 illustrate an alternative example of a desk fan 700 of the present invention having a removable base 704 supporting a fan 701. In this example, the fan clamp is replaced by a removable base 704 that supports a fan 701 pivotally attached to a support post 702 extending upward from removable base 704 of sufficient area on a support surface to support the fan 701 and prevent the desk fan 700 from tipping.

Figure 7:
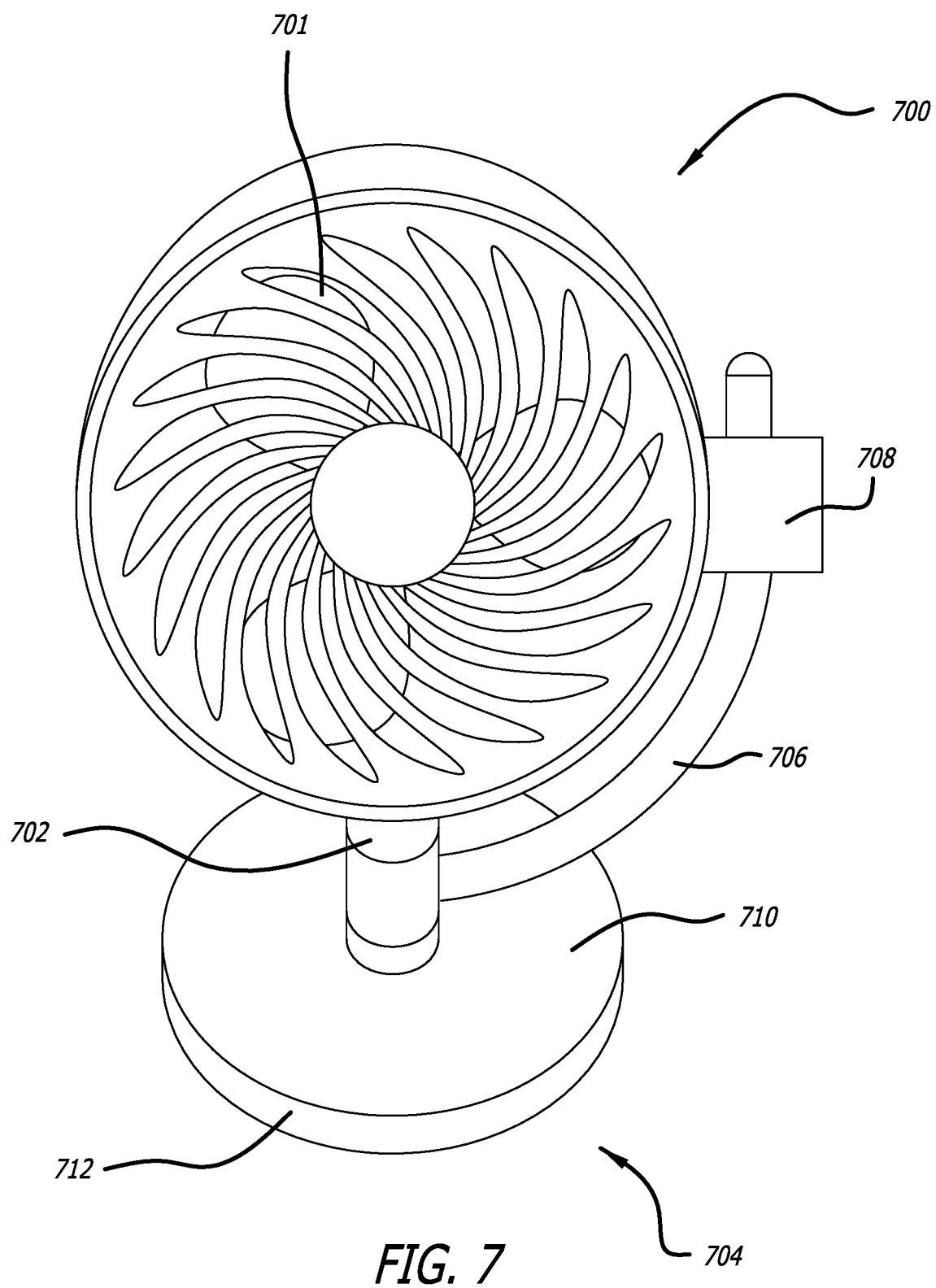
FIG. 7 is a front view of an alternative example of a desk fan of the present invention having a removable base supporting a fan.

FIG. 7 is a front view of an alternative example of a desk fan 700 of the present invention having a removable base 704 supporting a fan 701. Alternatively, the removable base 704 of the present invention can be used to support other articles in addition to a fan 701, without departing from the scope of the invention. The desk fan 700 includes a support post 702 positioned on top of the removable base 704 to support the fan 701. In this example, the support post 702 is a cylindrical member. Similar to the example provided above in connection with FIG. 1-6, a swing arm 706 having a sleeve rotatably coupled to an outer circumference of the cylindrical support post 702 supports the fan 701. A fan attachment 708 rotatably attaches the fan 701 to the swing arm 706. Further, as shown in FIG. 7, the removable support base 704 has an upper plate 710 and lower support member 712, where the upper plate 710 and lower support member 712 are removably attached to the support post 702, as will be shown and described below.

Figure 8:
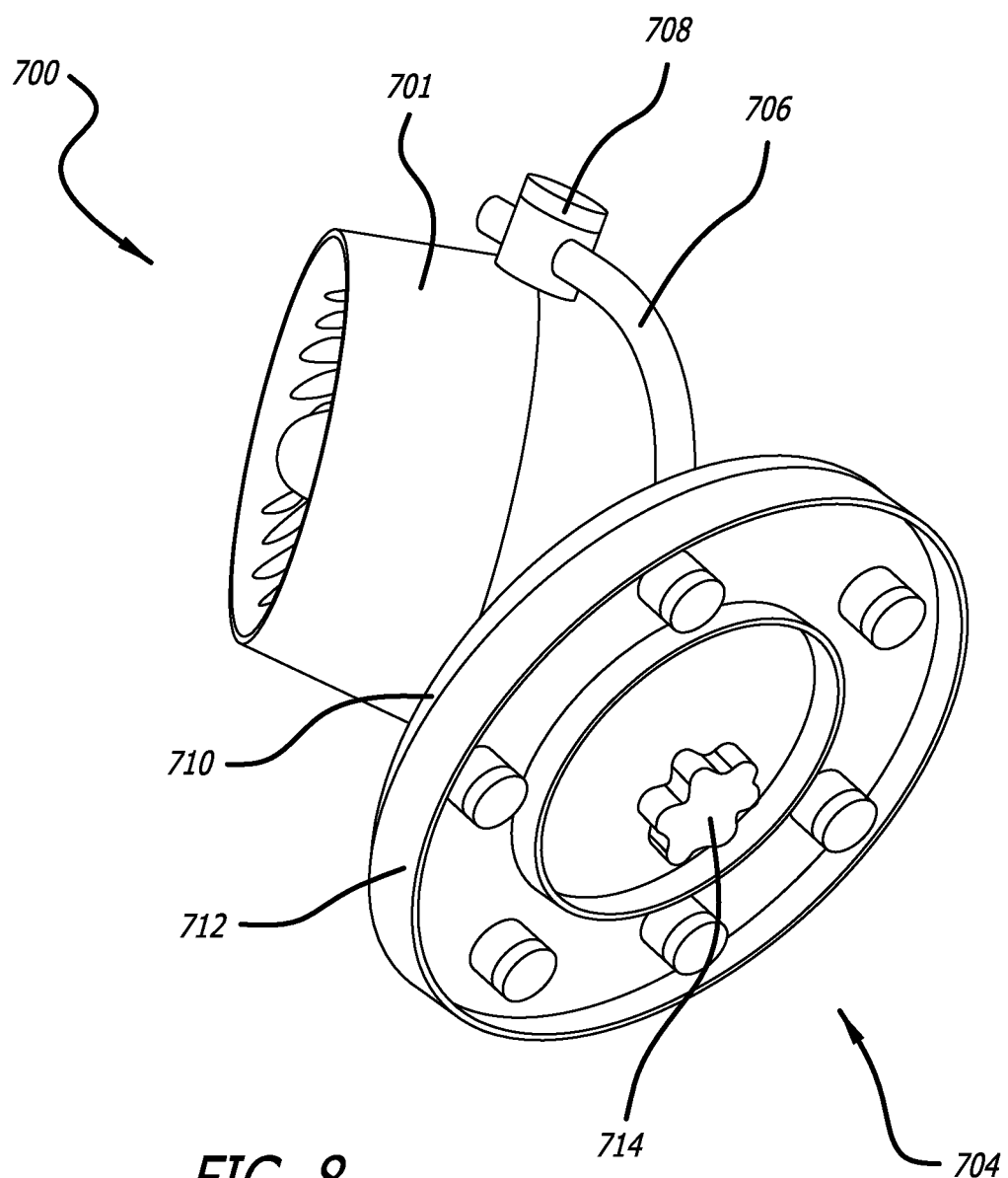
FIG. 8 is a bottom view of the removable base of the desk fan of FIG. 7.

FIG. 8 is a bottom view of the removable base 704 of the desk fan 700 of FIG. 7. As shown, the removable base 704, at its bottom, includes a fastener, which in this case is a screw 714 for removably attaching the removable base 704 to the support post 702, as further described below and illustrated in connection with FIGS. 9-17. In other examples, the fastener may be a snap, friction fit or locking type fastener or other fastener known in the art for removably attaching parts.

Figure 9:
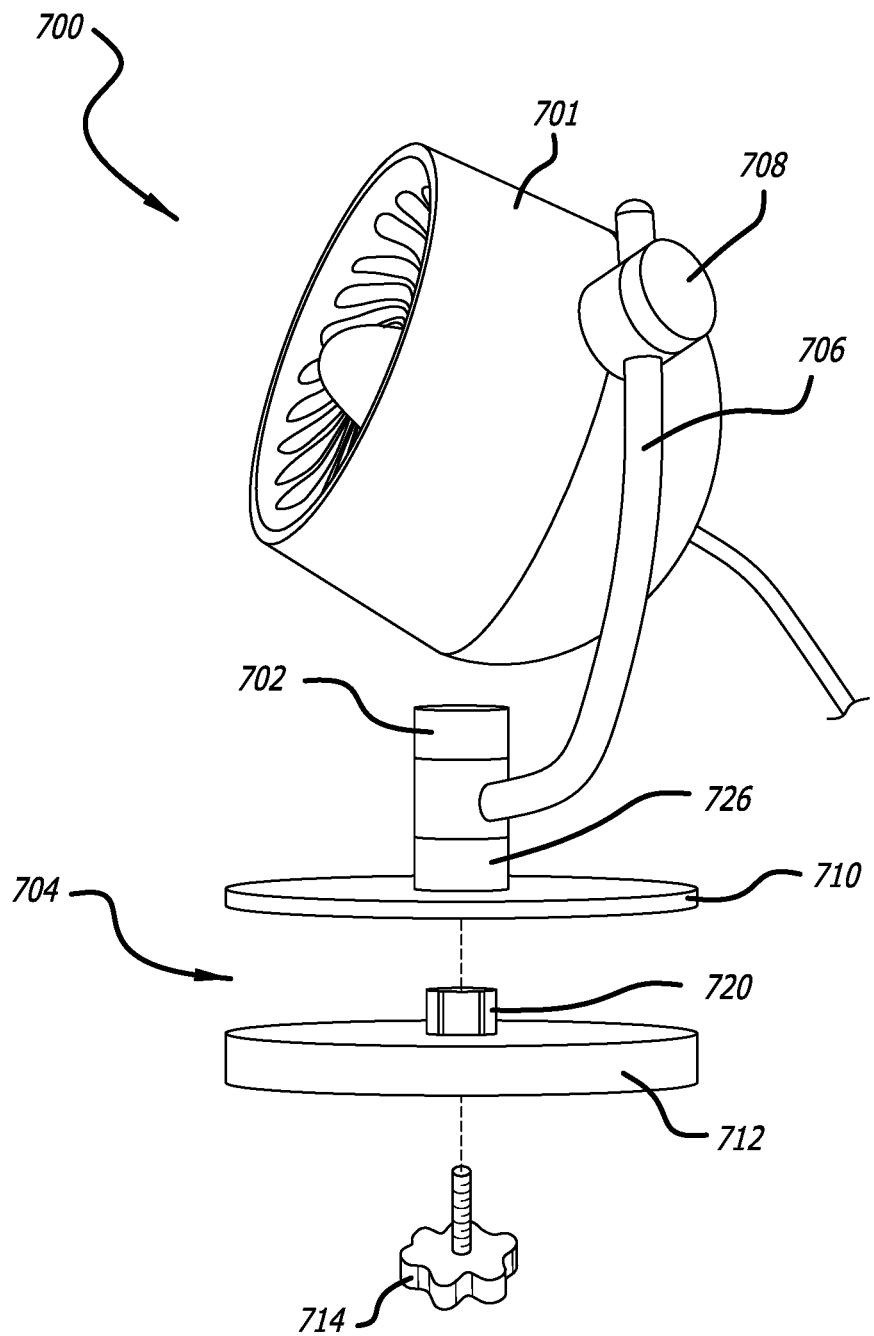
FIG. 9 is a side view of the desk fan of FIG. 7 with the removeable base detached.

FIG. 9 is a side view of the desk fan of FIG. 7 with the removable base 704 detached. Here, the screw 714 has been removed from the bottom of the removable base 704 allowing the removable base 704 to detach from the support post 702. When the screw 714 is removed, the removable base 704 separates from the support post 702 allowing the upper plate 710 and lower support member 712 to also separate.

Figure 10:
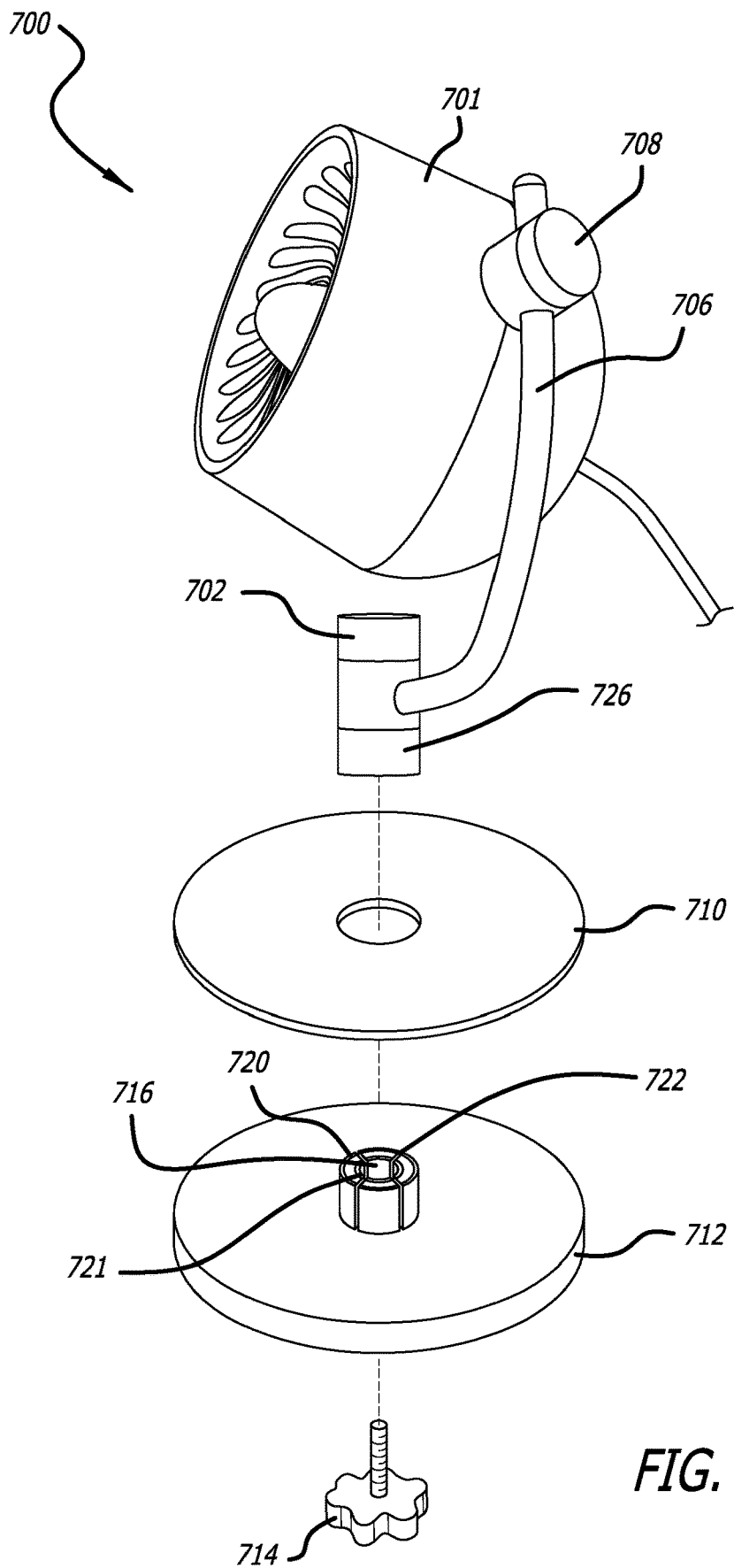
FIG. 10 is a top perspective view of the base removed from the fan of FIG. 7.

FIG. 10 is a top perspective view illustrating the removable base 704 detached from the support post 702. In the present example, both the upper plate 710 and lower supper member 712 are made of plastic; however, they could be made of other materials such as metal and/or glass. For example, the lower support member 712 could made of aluminum and the upper plate 710 could be made of glass.

As shown, both the upper plate 710 and the lower support member 712 are circular, however, they may be formed in other shapes such as square or rectangle without departing from the scope of the invention. In this example, the upper plate 710 is a transparent circular plate having approximately the same circumference as the lower support member 712. The upper plate 710 may also be translucent, however, it may be preferred that the upper plate be transparent. Both the upper plate 710 and lower support member 712 having central openings for receiving the threaded post of the screw 714.

Both the upper plate 710 and lower support member 712 include central openings 718, 716. The central opening 716 of the lower support member 712 is surrounded by two concentric raised circular rings 720, 721 that are spaced apart from one another, each having slots 722 that are aligned with slots 722 in the other ring. The central opening 718 in the upper plate 710 is larger than the outer circular ring 720 to allow for a sleeve 726 to fit between the outer circular ring 720 and the perimeter edges of the central opening 718 to firmly seat the support post 702 against the removable base 704 when secured to one another.

Figure 11:
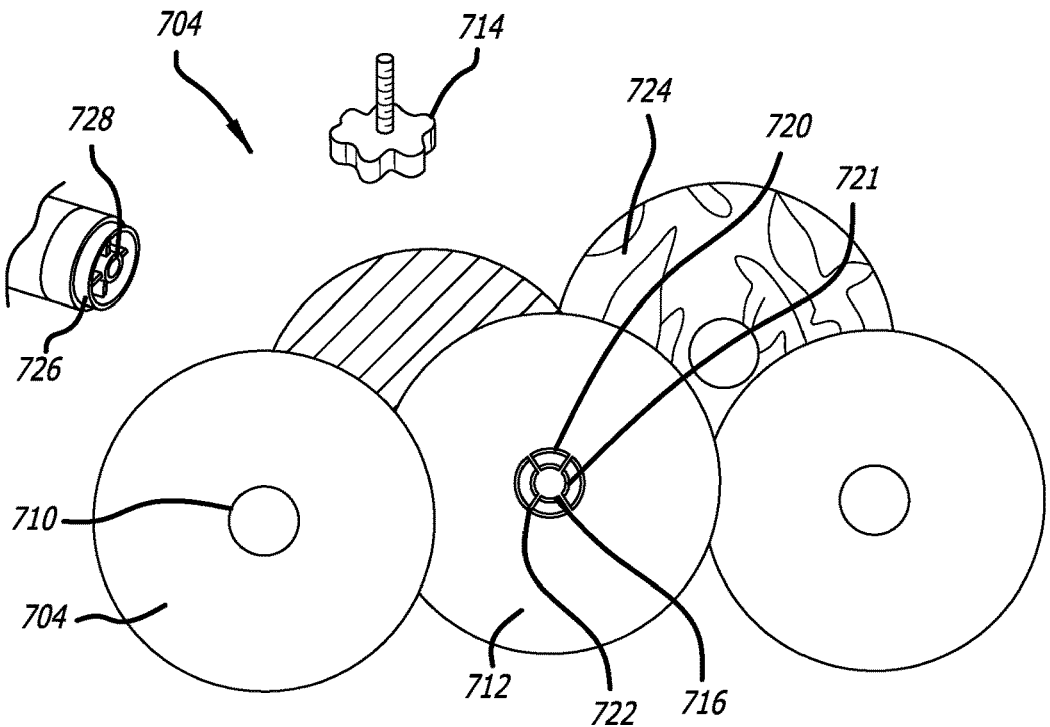
FIG. 11 is a top perspective view of the removable base of the desk fan of FIG. 10 showing various optional decorative disks that may be used with the removable base.
Figure 12:
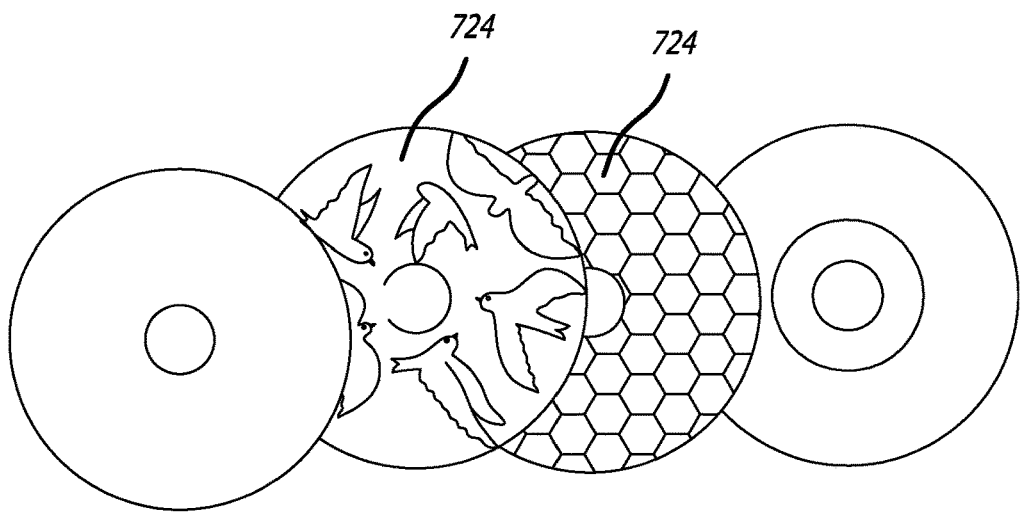
FIG. 12 is a top perspective view of alternative decorative disks that may be used with the removable base of FIG. 10.

FIG. 11 is a top perspective view of the removable base 704 of the desk fan 700 of FIG. 10 showing various optional interchangeable substrates, or decorative disks 724 that may be used with the removable base 704, and FIG. 12 illustrates additional decorative disks 724. The present invention may come with a first interchangeable substrate or decorative disk 724, a second interchangeable substrate or decorative disk 724 and/or a plurality of additional interchangeable substrate or decorative disks 724. The disks 724 may be made of paper, cloth, plastic, glass, metal, wood or any type of material that can display or be made to display a decoration on a surface.

As illustrated, the various disks 724 are interchangeable to provide different decorative appearances for the desk fan 700. As shown, the disks 724 are of substantially the same shape as the removable support base 704. As the upper plate 710 is transparent, when the disk 724 is placed between the upper plate 710 and the lower support member 712, the decorative pattern on the disk 724 appears through the upper plate 710. All the disks 724 have holes in the center so that they can sit on the top of the lower support member 712 yet allow the concentric circles 720, 721 to pass through the hole in the center of the disks 724. Although not shown, the disk 724 may include decorative patterns on both sides of the disks 724 such that they are reversible. Further, the desk fan 700 may include blank disks 724 for a user to decorate.

Figure 13:
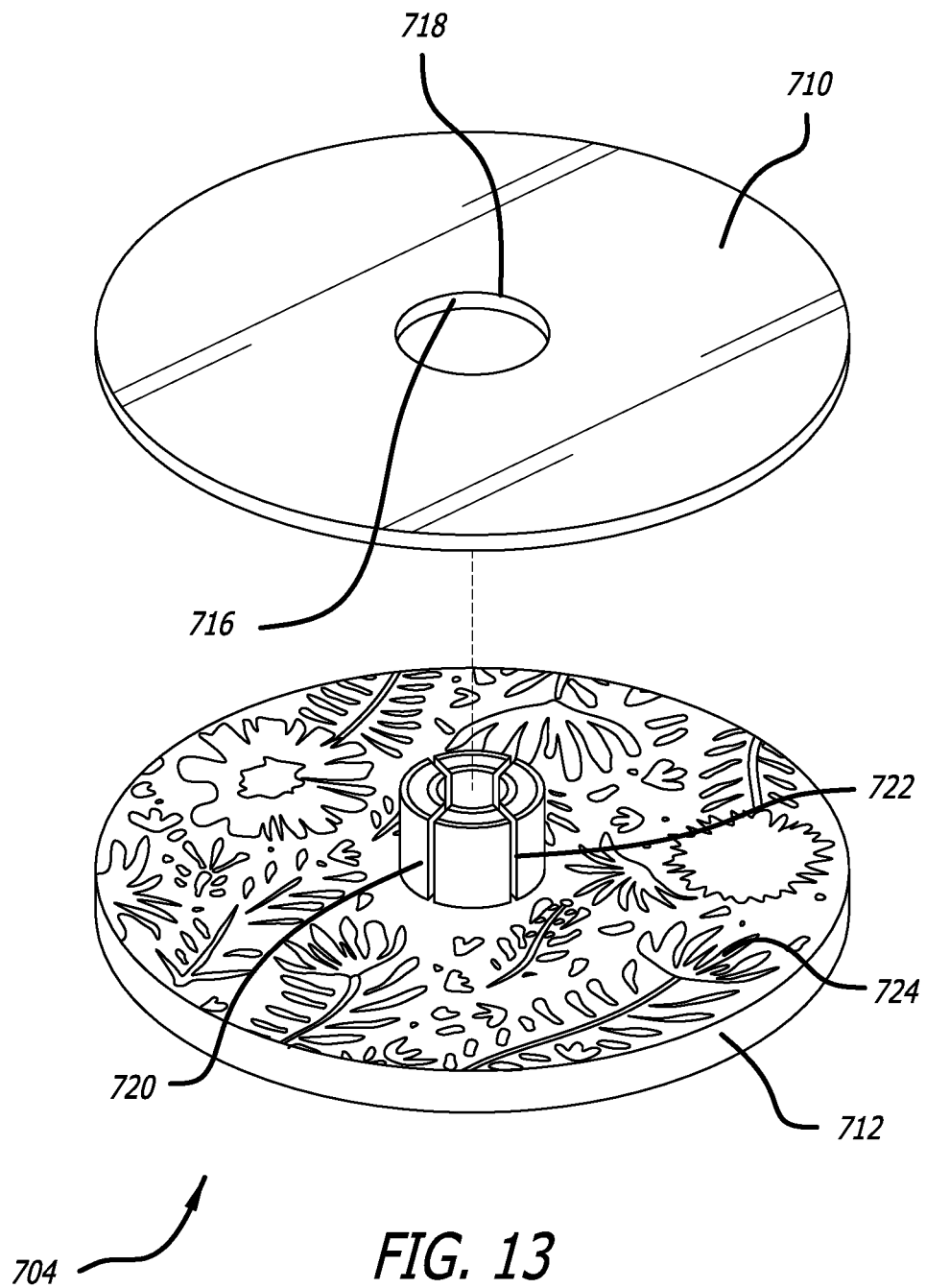
FIG. 13 is an exploded view of the removable base of FIG. 10 showing the relative placement of the decorative disk in the removable base.

FIG. 13 is an exploded view of the removable base 704 of FIG. 10 showing the relative placement of the decorative disk 724 in the removable base 704. In this example, the removable support base 704 and decorative disk 724 are both circular and have substantially the same or the same diameter. The decorative disk 724 is positioned on top of the lower support member 712 and the upper plate 710 is positioned over the decorative disk, as shown.

Figure 14:
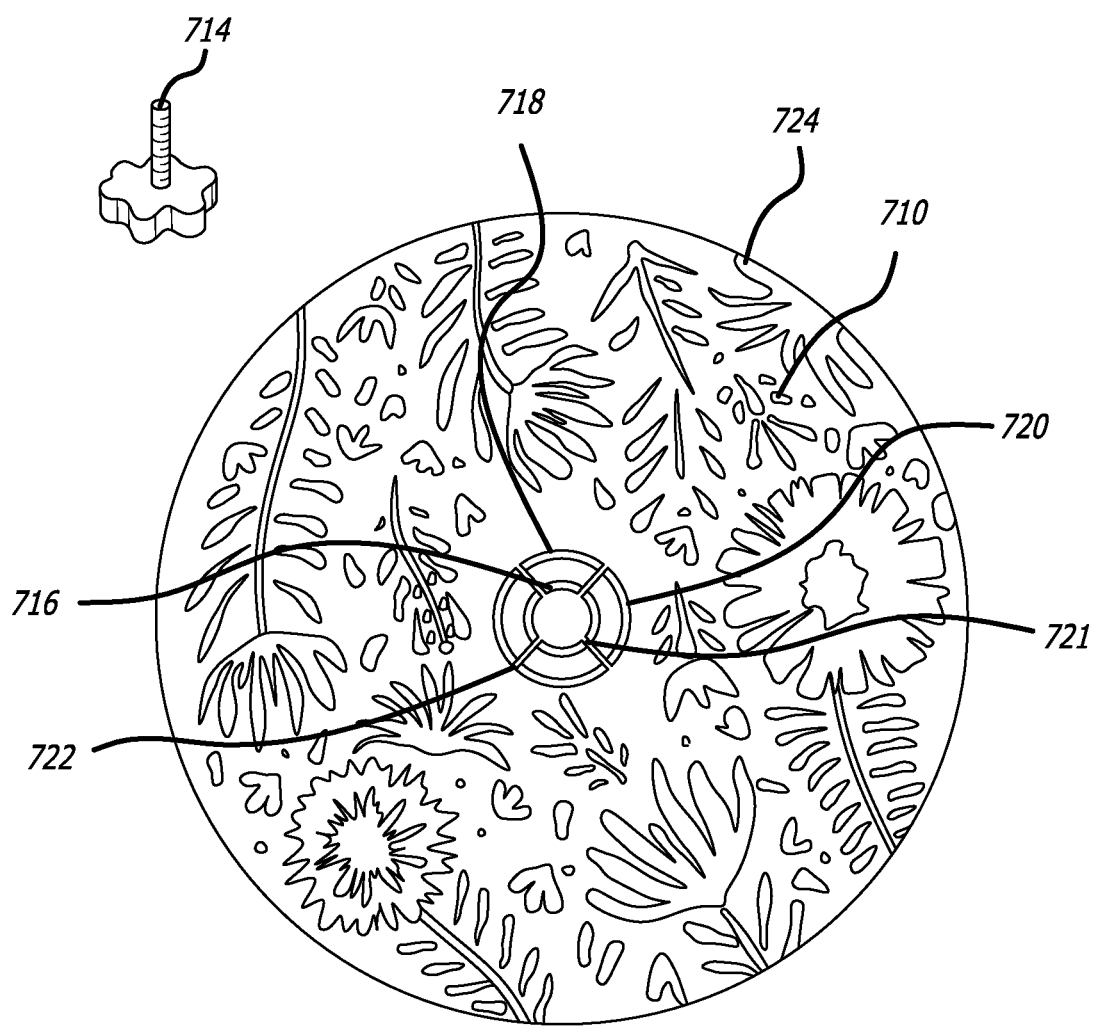
FIG. 14 is a top view of the removable base of FIG. 10 with a decorative disk positioned in the removable base.

FIG. 14 illustrates a top view of the removable base 704 of FIG. 10 with a decorative disk 724 positioned in the removable base 704. As the upper plate 710 is transparent, the decorative disk 724 can be seen through the upper plate 710. When the disk 724 is changed, the appearance of the removable base 704 is also altered.

Figure 15:
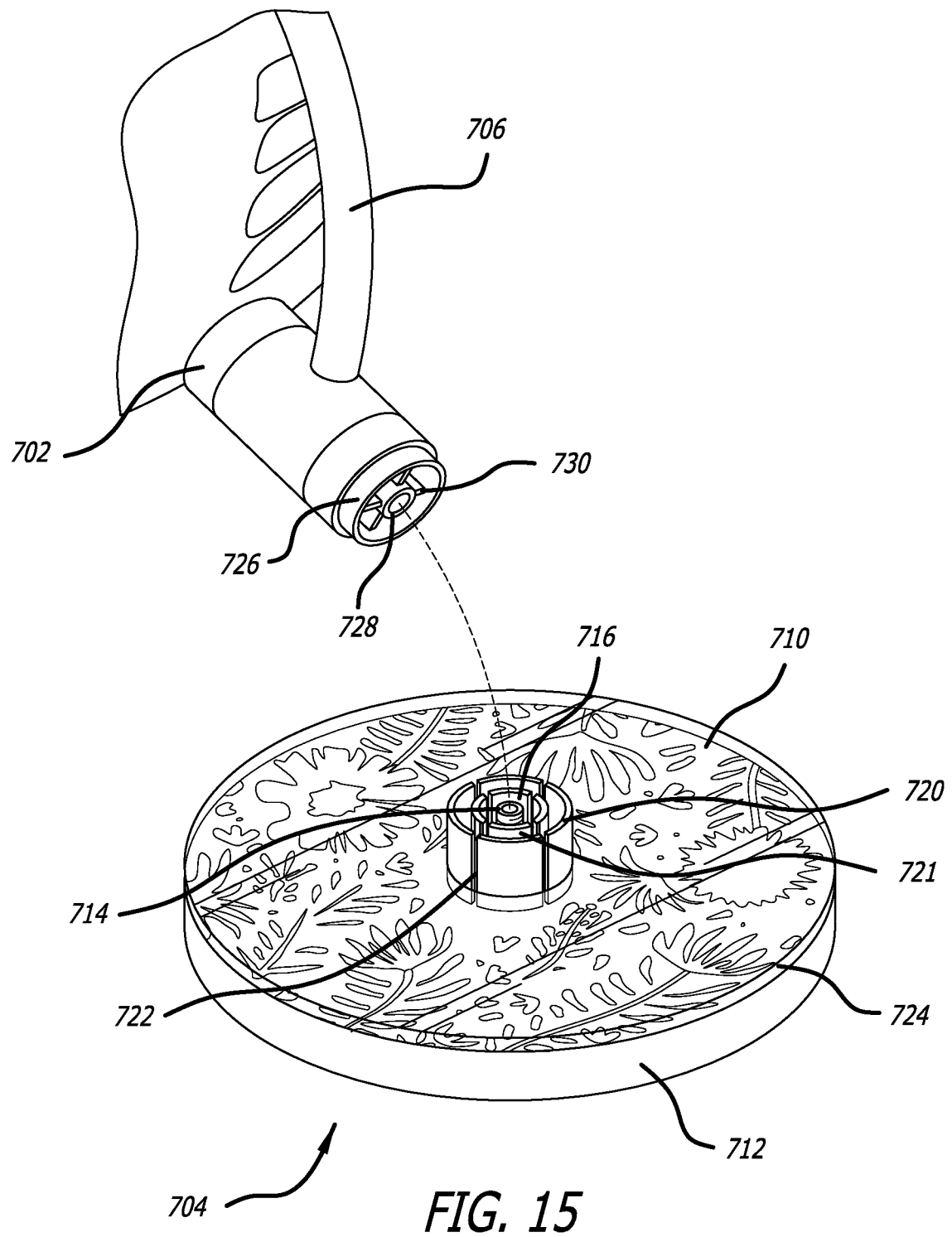
FIG. 15 is top view of the removable base of FIG. 10 illustrating a screw positioned through the center opening in the removable base.
Figure 16:
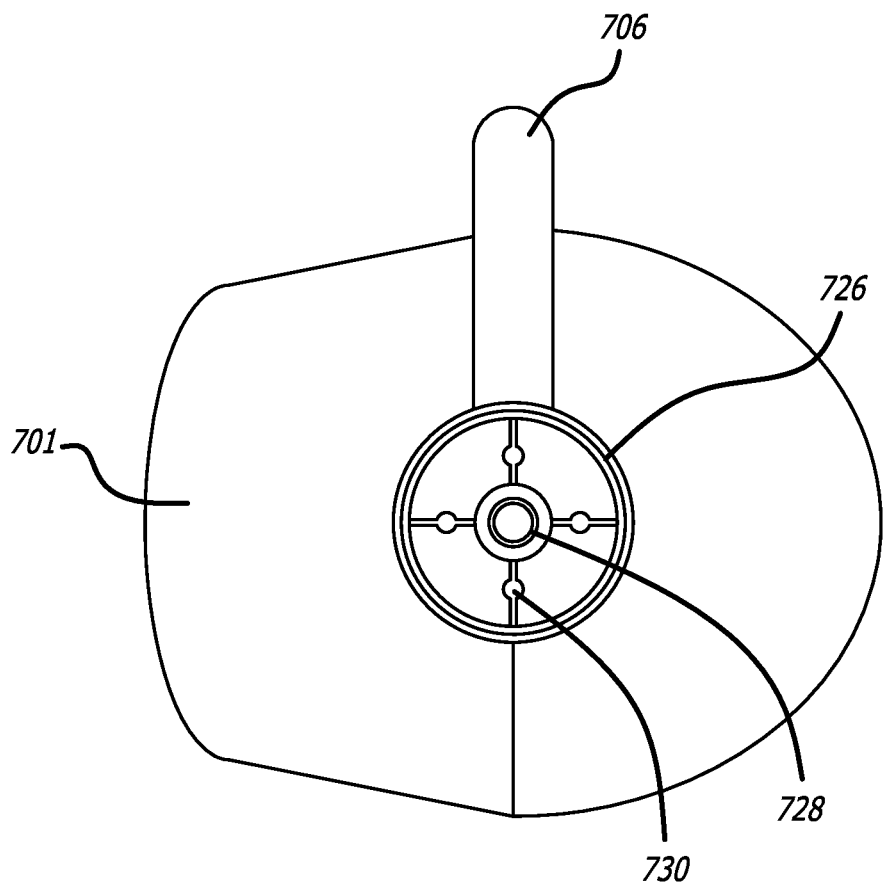
FIG. 16 is a bottom view of the support post of the desk fan of FIG. 7.
Figure 17:
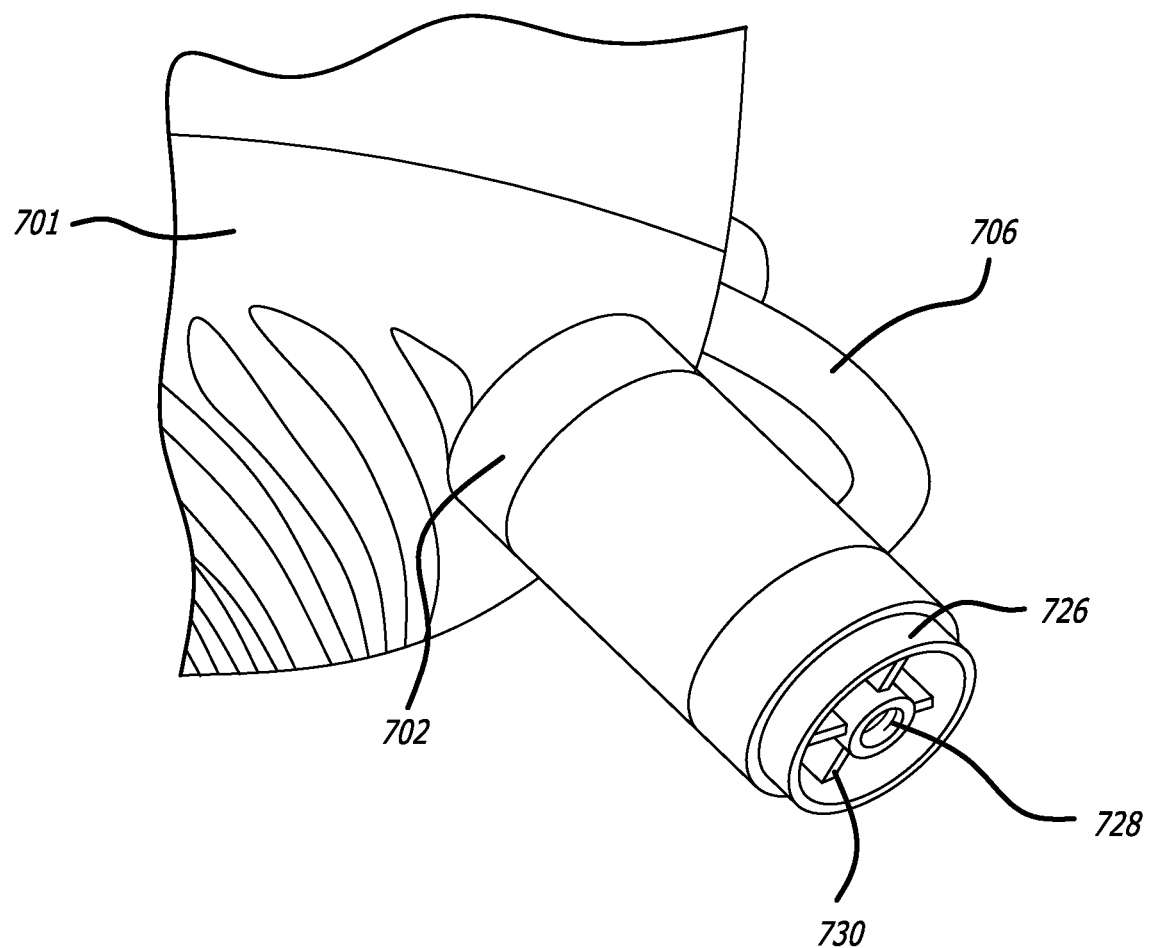
FIG. 17 is a bottom perspective view of the support post of the desk fan of FIG. 7.

FIGS. 15-17 illustrate how the removable base 704 is removably affixed to the support post 702. FIG. 15 is top view of the removable base 704 of FIG. 10 illustrating the threaded post of the screw 714 positioned through the center opening 716 of the lower support member 712 of the removable base 704. FIG. 16 is a bottom view of the support post 702 of the desk fan 700, and FIG. 17 is a bottom perspective view of the support post 702 of the desk fan 700.

As best illustrated in FIG. 16, the bottom of the support post 702 included a threaded insert 728 for receiving the threaded post of the screw 714. Spokes 730 are provided between the threaded insert 728 and the walls of the support post 702. The spokes 730 align with the slots 722 in the raised concentric rings 720, 721 on the lower support member 712 of the removable base 704, such that the bottom of the support post 702 rests flush against the upper surface of the lower support member 712. The inner raised ring 721 is positioned around the housing for the threaded insert 728 and the outer raised ring 720 is positioned against the inside of the sleeve 726. The threaded post of the screw 714 tightens the lower support member 704 against the support post 702 by inserting the threaded post of the screw 714 into the threaded insert 728. The sleeve 726, when the support post 702 is secured against the lower support member 704 is positioned between the outer perimeter of the outer ring 720 and the opening 718 of the upper plate 710.

Figure 18:
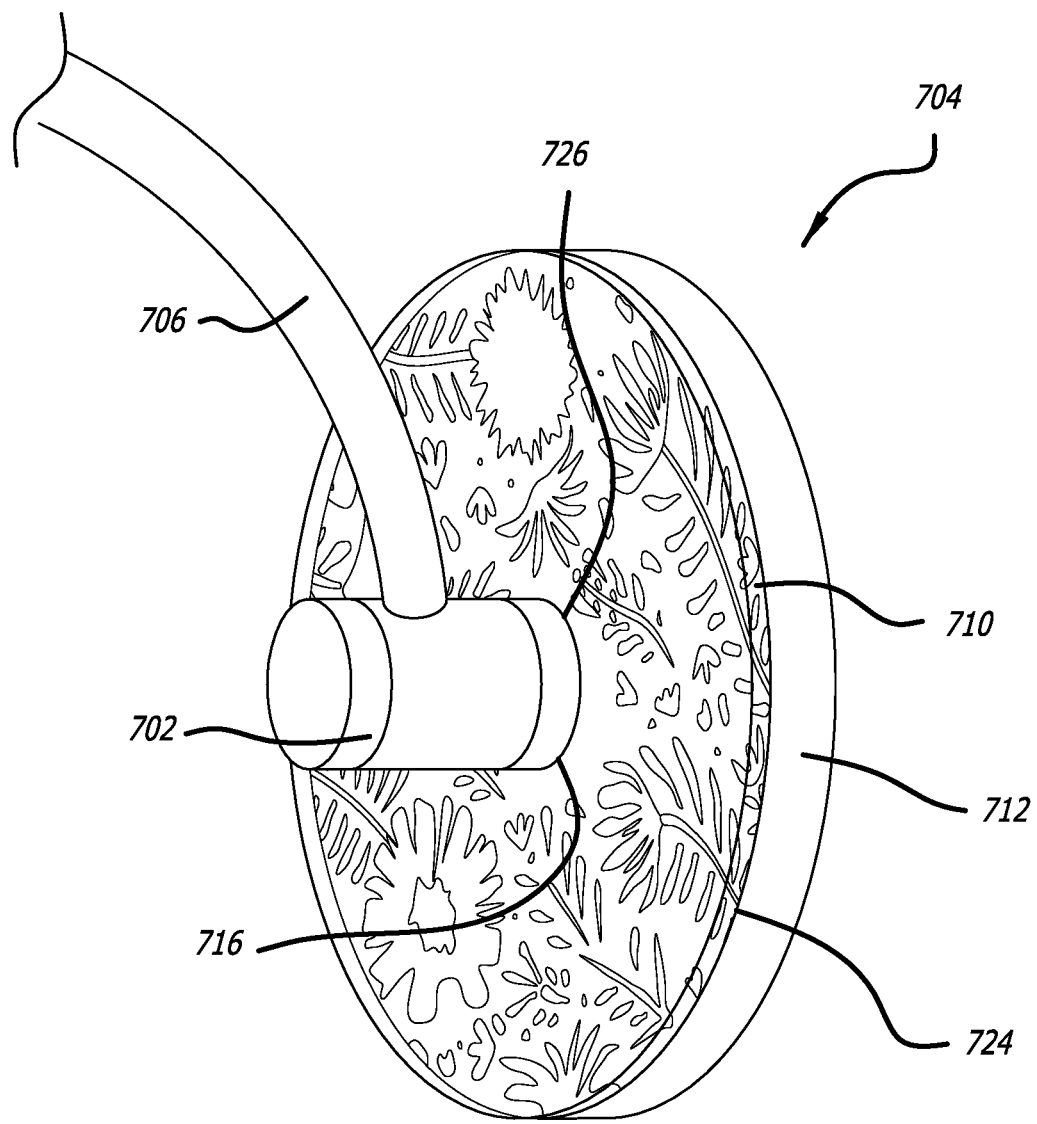
FIG. 18 is a side view of the removable base of the desk fan of FIG. 7 attached to the support post.
Figure 19:
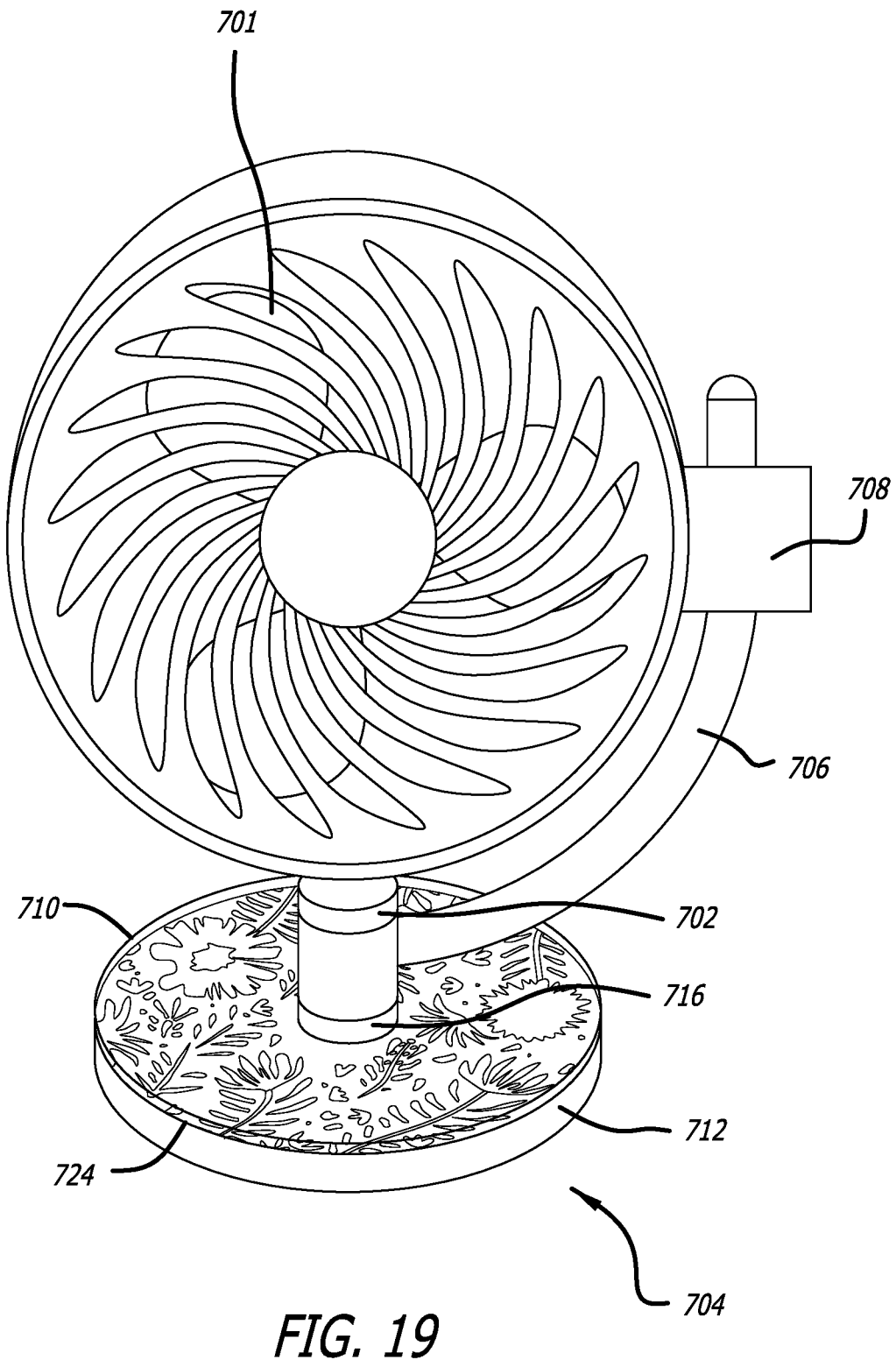
FIG. 19 is a front perspective view of the desk fan of FIG. 7 with a decorative disk positioned in the removable base of the desk fan.

FIG. 18 is a side view of the removable base 704 of the desk fan 700 attached to the support post 702. Here, the removable base 704 has a first interchangeable substrate or decorative disk 724 positioned in the removable base. FIG. 19 is a front perspective view of the desk fan 700 with a decorative disk 724 positioned in the removable base 704 of the desk fan 700.

The foregoing description of an implementation has been presented for purposes of illustration and description. It is not exhaustive and does not limit the claimed inventions to the precise form disclosed. Modifications and variations are possible in light of the above description or may be acquired from practicing the invention. The claims and their equivalents define the scope of the invention.

We claim:

1. A desk fan comprising:
    a fan supported by a support post;
    a removable support base positioned on one end of support post, the removable support base having an upper plate and lower support member, where the upper plate and lower support member are removably attached to the support post and where the upper plate member is separable from the lower support member when detached from the support post; and
    a first interchangeable substrate positioned between the upper plate and lower support member.

2. The desk fan of claim 1 where the first interchangeable substrate is a first decorative substrate that is interchangeable with a second decorative substrate by disconnecting the removable support base from the support post, separating the upper plate member and lower support member, removing the first decorative substrate from between the upper plate and lower support member and replacing it with the second decorative substrate.

3. The desk fan of claim 1 further including a screw, where the removeable support base is screwed to the support post.

4. The desk fan of claim 3 where the removable support base has a central opening for receiving the screw and where support post includes a bottom having a threaded insert located at the bottom of the support post for receiving the screw.

5. The desk fan of claim 1 where the removable support base is circular and has a diameter and where the interchangeable substrate is also circular and has the same diameter as the removable support base.

6. The desk fan of claim 1 where the upper plate member is transparent.

7. The desk fan of claim 1 where the upper plate member is translucent.

8. The desk fan of claim 1 further including a plurality of additional interchangeable substrates for replacing the first interchangeable substrate.

9. The desk fan of claim 1 where the support post is a cylindrical member and where the desk fan further includes a swing arm having a sleeve rotatably coupled to an outer circumference of the support post.

10. The desk fan of claim 9 further including a fan attachment for pivotally attaching the fan to the end of the swing arm positioned away from the support post.

11. The desk fan of claim 1 where the removable support base is circular and has a diameter and where the interchangeable substrate is also circular and has the same diameter as the removable support base.

12. The desk fan of claim 1 further including a plurality of additional interchangeable decorative substrates for replacing the first interchangeable decorate substrate, where the first and plurality of additional decorative substrates are made of paper.

13. A desk fan comprising:
a cylindrical support post having an outer circumference;
a removable support base positioned on one end of cylindrical support post, the removable support base having an upper plate and lower support member, where the upper plate and the lower support member are removably attached to the support post and where the upper plate member is translucent and separable from the lower support member when the removable support base is detached from the support post;
a first interchangeable decorative substrate positioned between the upper plate and lower support member;
a swing arm rotatably coupled to the outer circumference of the cylindrical member with a circular sleeve so that the swing arm may swivel about the cylindrical member; and
a fan attached to the swing arm at its end opposing the circular sleeve.

14. The desk fan of claim 13 where the removable support base has a central opening for receiving a screw and where the cylindrical support post includes a bottom having a threaded insert located at the bottom of the cylindrical support post for receiving the screw.

15. A method for supporting an article in a support base, the method comprising the steps of:
providing a support base having an upper plate and lower support member, where the upper plate is removably secured to the lower plate and where the upper plate member is transparent;
providing a first interchangeable substrate positioned between the upper plate and lower support member, where first interchangeable substrate is a first decorative substrate;
providing a second decorative substrate; and
interchanging the first interchangeable substrate with the second decorative substrate by separating the upper plate member from the lower support member of the support base, removing the first decorative substrate from between the upper plate and lower support member and replacing it with the second decorative substrate.

16. The method of claim 15 where the support base is affixed to a support post extending from the top of the support base to support an article, the support base being removably affixed to the post by a fastener.

17. The method of claim 16 where the fastener is a screw, and where the support base has a central opening for receiving the screw and where support post includes a bottom having a threaded insert located at the bottom of the support post for receiving the screw.

18. The method of claim 16 where the support post is a cylindrical member and where the article is a desk fan mounted to the support post by a swing arm having a sleeve rotatably coupled to an outer circumference of the support post.

19. The method of claim 15 where the removable support base is circular and has a diameter and where the first interchangeable substrate is also circular and has the same diameter as the removable support base.

20. The method of claim 15 further including the step of providing a plurality of additional interchangeable substrates for replacing the first interchangeable substrate or second decorative substrate.

* * * * *